June 5, 1956  A. H. EADIE  2,748,557
LAWN CONDITIONER RAKE
Filed Nov. 24, 1954
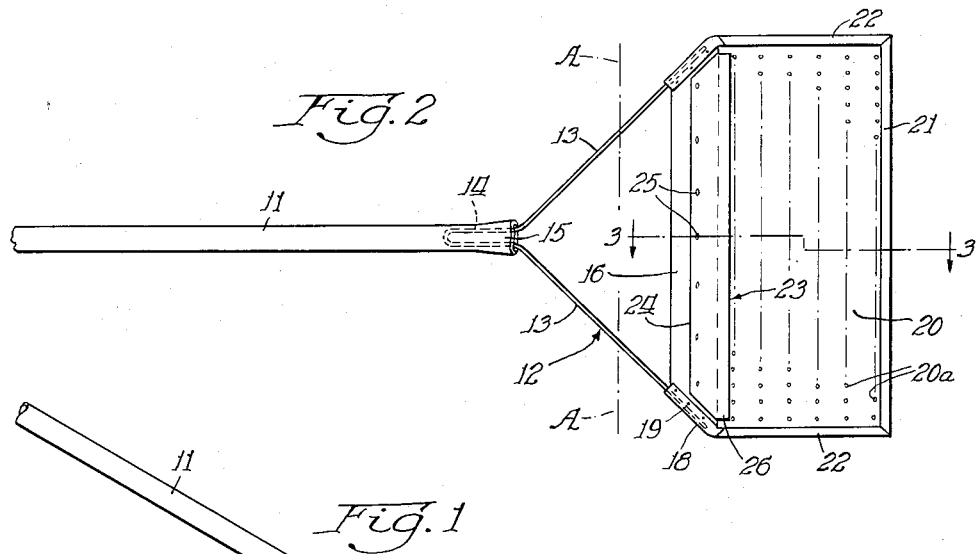
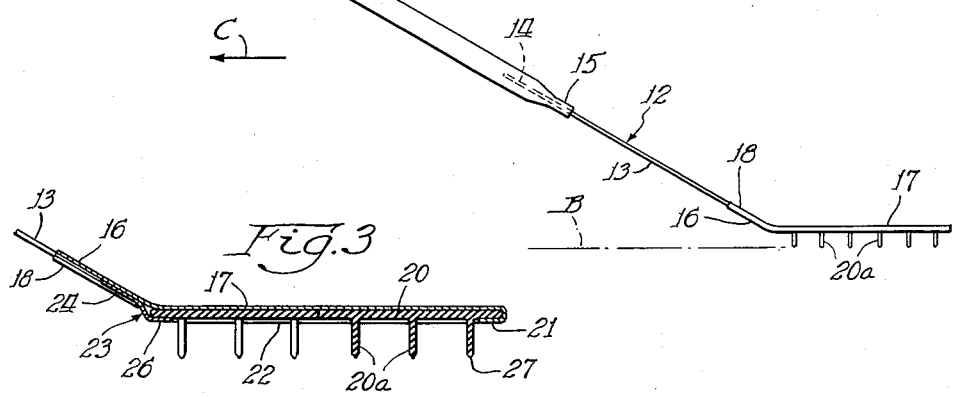
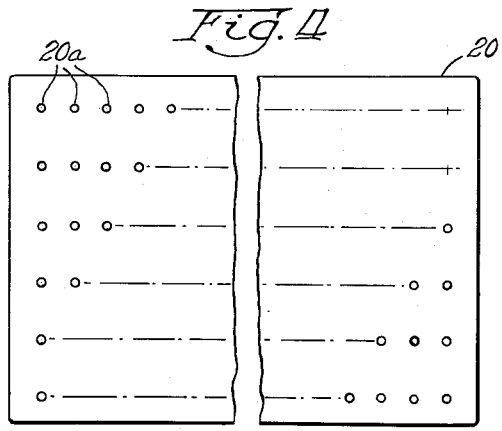
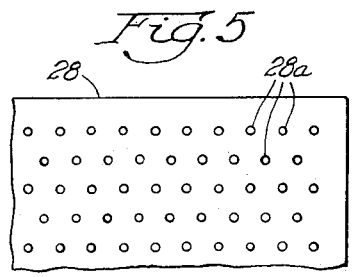
Inventor:
Andrew H. Eadie
By: Jones, Tuch + Darbo
Attys.

United States Patent Office 2,748,557
Patented June 5, 1956

2,748,557

LAWN CONDITIONER RAKE

Andrew H. Eadie, Homewood, Ill.

Application November 24, 1954, Serial No. 471,013

3 Claims. (Cl. 56—400.16)

This invention relates to a lawn conditioner rake.

Among other objects, the invention aims to provide a rake of this class that is of light weight and easily manipulatable by hand and which will collect leaves, grass cuttings and other debris from a lawn or the like with a single sweep of the rake while at the same time gently stimulating and straightening the grass blades without injury to the roots of the grass.

An important aspect of the present invention is that the part of the rake which comes into contact with the grass is formed of a relatively soft elastomer material rather than a hard material. By elastomer material is meant a natural or synthetic rubber or one of the synthetic elastomers resembling rubber in softness, elasticity, flexibility and resilience.

The rake of the present invention is particularly adapted for use on golf course greens and other well kept lawns where it is desired to remove all leaves, grass cuttings and other extraneous matter daily without injury to the green and while stimulating a thick uniform growth thereof.

These and other objects and advantages will be apparent from the following description, taken together with the accompanying drawings, of an illustrative embodiment of the invention, and in which drawings—

Figure 1 is a side elevational view of a rake embodying the present invention, the handle being discontinued to save space;

Figure 2 is a bottom plan view of the rake of Fig. 1;

Figure 3 is an enlarged section taken on the staggered line 3—3 of Fig. 2, but inverted so as to correspond with the position of Fig. 1, for clearness of description;

Figure 4 is an enlarged fragmentary bottom plan view of the rubber-like mat shown in the previous figures on the scale of Fig. 3; and Figure 5 is a view, somewhat similar to Fig. 4, of a modified form of mat.

Referring in detail to the illustrative construction shown on the drawings, the usual rake handle 11 may be of any suitable construction being here shown of tubular metal, to which, in accordance with the present invention, is secured an intermediate web member 12 that flares outwardly at each side transversely of the rake as best seen in Fig. 2. In this instance the web member 12 comprises a pair of rods 13 that for convenience of construction are here shown formed integrally of a rather heavy wire that is bent in V-shape, having a bight portion 14 that has its sides close together for a short distance and is there firmly secured to the handle 11 as by having the tubular metal of the handle crimped as at 15 about the bight 14, the handle being flattened thereat for this purpose as shown. At their other ends the rods 13 diverge away from their connection with the handle and are firmly secured at their extremities to an upwardly and rearwardly inclined flange portion 16 of a metal sheet or plate 17, the securement of the rods 13 thereto being illustrated by rolled edges 18 of the flange portion 16 of the plate that are curled to receive the ends of the rods 13 respectively, at each side of the rake, the rod and rolled edge being thereupon desirably spot welded together as at 19.

The rods 13 thus provide a web member having some flexibility and limited resilience so that the handle 11 of the rake may be adjusted to varying angles, for example, to accommodate the height of a person using the rake, such pliability functioning somewhat along the line A—A here shown extending transversely of the rake.

The plate 17 serves as a backing for a mat of elastomer or rubber-like material 20 that is formed preferably of a synthetic known as "Hycar", which is resistant to deterioration from the effects of oil, sunlight, heat and cold and the like, as well as water and other moisture. On the face of the mat 20 that is the underside thereof when the rake is in operative position the mat carries a large number of integral tines 20a that are arranged in rows longitudinally and transversely of the rake as presently more particularly described.

The mat 20 is here shown secured to the underface of the backing plate 17 as by having the distal edge 21 of the plate 17 the side margins 22 thereof bent over onto the adjacent margins of the mat 17, and, if desired, the mat and plate may be cemented together throughout their contiguous faces. To further enhance the securement of the mat to the plate, there is here shown a metallic angle strip 23 on the underside of the rake that has one flange 24 riveted to the plate flange 16 as at 25 and another flange 26 bent into the plane of the margins 21 and 22 that overlies the adjacent margin of the mat 20 to complete the rectangle formed by this flange with the turned-over margins 21 and 22, thus providing a pocket for the mat on the underface of the plate 17.

The tines 20a are relatively short, as seen in the drawing, so as not to have excessive flexibility, and are say of the order of ⅝ inch long and ⅛ inch in diameter, preferably coming to a slightly reduced point at their terminations as at 27. The tines in this instance are arranged in rows six in number from front to rear of the mat, but it will be understood that five or seven rows, more or less would be suitable. The mat as here shown may be, say fifteen inches long in the direction transversely of the rake and about seven and one-half inches wide in a direction from front to rear of the rake, but it will be understood that any dimensions appropriate to the size of rake desired would be suitable.

Transversely of the mat the tines are shown spaced apart approximately ½ inch. There are say from twenty-five or more tines in a row extending transversely of the rake, thus totaling approximately one-hundred and fifty tines over the entire undersurface of the mat 19. It will be understood that even more tines may be provided as may be necessary for a given desired size for the mat. The horizontal or main portion 20 of the mat is desirably about ⅛ inch thick. A hardness for the mat of the order of say 50 to 60 Shore Durometer A, which is a reading for relatively soft rubber, is suitable.

As best seen in Fig. 1 the rake in use is disposed with the mat 20 in horizontal position on the ground or lawn B with the tines 20a contacting the grass on the lawn. The mat is held in this horizontal position parallel to the ground by the relative rigid backing member 17, the web member 12 being bent or flexed along the line A—A to adjust the angle of the handle to the horizontal position of the plate and mat. This flexibility of the web member 12 not only accommodates varying heights of persons using the rake but also prevents injury to the turf by providing accommodation of the rake to unevenness in the ground due to various causes. It will be readily understood that when the rake is drawn or pulled over the surface B in the direction of the arrow C, by the user grasping the handle 11 for this purpose, as is conventionally done with rakes, the mat 20 with its tines 20a will move in the direction C parallel and in contact with the ground B and will remove from the grass on the ground B the undesirable leaves, grass clippings, and other debris which may be present before the rake has been passed over a given surface. The plate flanged portion 16 provides an abutment or guard that prevents leaves and the like from riding over the plate and acts as a baffle.

As so constructed and arranged, it has been found that a rake of the present invention will generally remove such debris with a single sweep of the rake, thus avoiding unnecessary raking which might tear or disturb the roots of the grass. The flexible integral tines 20a, of relatively soft rubber, treat the grass gently while at the same time flexing as required to find their way between the blades of grass for the purpose of removing debris therefrom. The large number of short tines covers a substantial area of the grass thoroughly, and if one row of the tines happens to miss a particular fragment of debris a succeeding row is likely to remove it, the guard 16 directing the debris thereto.

For the purpose of enhancing assurance that all debris will be removed at a single stroke of the rake, the rows of tines may be staggered as shown in Fig. 5, for example, this modified form of mat 28 having the tine arrangement shown at 28a.

There is thus here described an improved rake that serves as a lawn conditioner as well as a rake, while at the same time it is durable, of light weight and easily manipulatable by hand, and which always presents a flat surface to the ground.

An illustrative embodiment having been described in accordance with the statutes, such adaptations including modifications or additions, may be made as incorporate what is defined in the appended claims without departing from the invention.

What is here claimed is:

1. A lawn conditioner rake comprising a transversely elongated mat of elastomer material having depending integral relatively short tines arranged in multiple rows on its lower face, said mat having a pair of shorter edges and a pair of longer edges, a backing sheet of somewhat rigid material on the upper face of said mat and secured thereto, a somewhat triangular web member of resilient flexible material attached to said backing sheet along one of the longer edges of the mat and being adjacent its shorter edges, said web member extending obliquely upwardly from said sheet and having its sides converging adjacent a line centrally transverse of the longer edges of the mat, a baffle-like guard plate extending along the longer edge of the mat to which the web member is adjacent and secured between the sides of the web member, said guard plate providing an obliquely upwardly extending continuation of the sheet, and a handle attached to the web member in the region of said line of convergence of its sides.

2. A lawn conditioner rake comprising a transversely elongated mat of elastomer material having depending integral relatively short tines arranged in multiple rows on its lower face, the tines being of the order of five-eighths inch long and one-eighth inch in diameter and being spaced approximately one-half inch apart transversely, several rows of said tines extending transversely of the rake with approximately twenty-five tines in each row, a backing sheet of somewhat rigid material on the upper face of said mat and secured thereto, a web member of resilient flexible material attached to said backing sheet, said web member extending obliquely upwardly from said sheet, a baffle-like guard plate secured between the sides of the web member, said guard plate providing an obliquely upwardly extending continuation of the sheet, and a handle attached to the web member.

3. A lawn conditioner rake comprising a transversely elongated mat of elastomer material having depending integral relatively short tines arranged in multiple rows on its lower face, the hardness of the elastomer material being of the order of 50 to 60 Shore Durometer A, a backing sheet of somewhat rigid material on the upper face of said mat, a web member of resilient flexible material attached to said backing sheet along one of the longer edges of the mat, said web member extending obliquely upwardly from said sheet, a baffle-like guard plate extending between the sides of the web member, said guard plate providing an obliquely upwardly extending continuation of the sheet, and a handle attached to the web member.

References Cited in the file of this patent

UNITED STATES PATENTS

| | | |
|---|---|---|
| 889,656 | Burckhalter | June 2, 1908 |
| 1,193,287 | Morgan | Aug. 1, 1916 |
| 1,578,074 | Chandler | Mar. 23, 1926 |
| 1,683,866 | Chandler | Sept. 11, 1928 |
| 1,780,748 | Fisher | Nov. 4, 1930 |
| 2,069,958 | Kool | Feb. 9, 1937 |
| 2,172,464 | Anderson | Sept. 12, 1939 |